Figure 6:
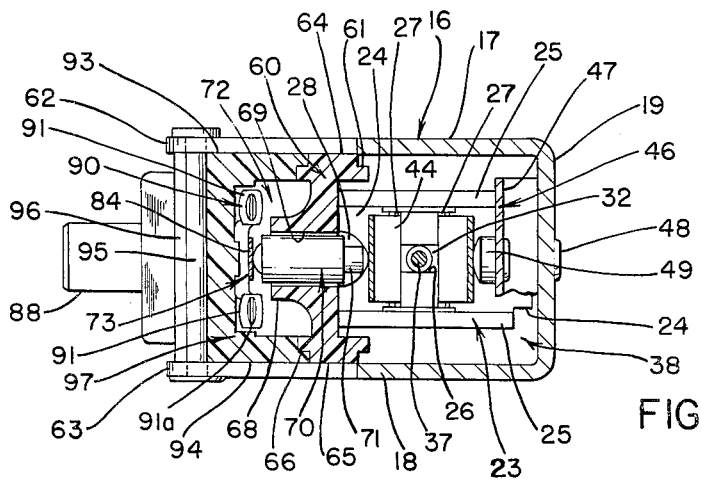

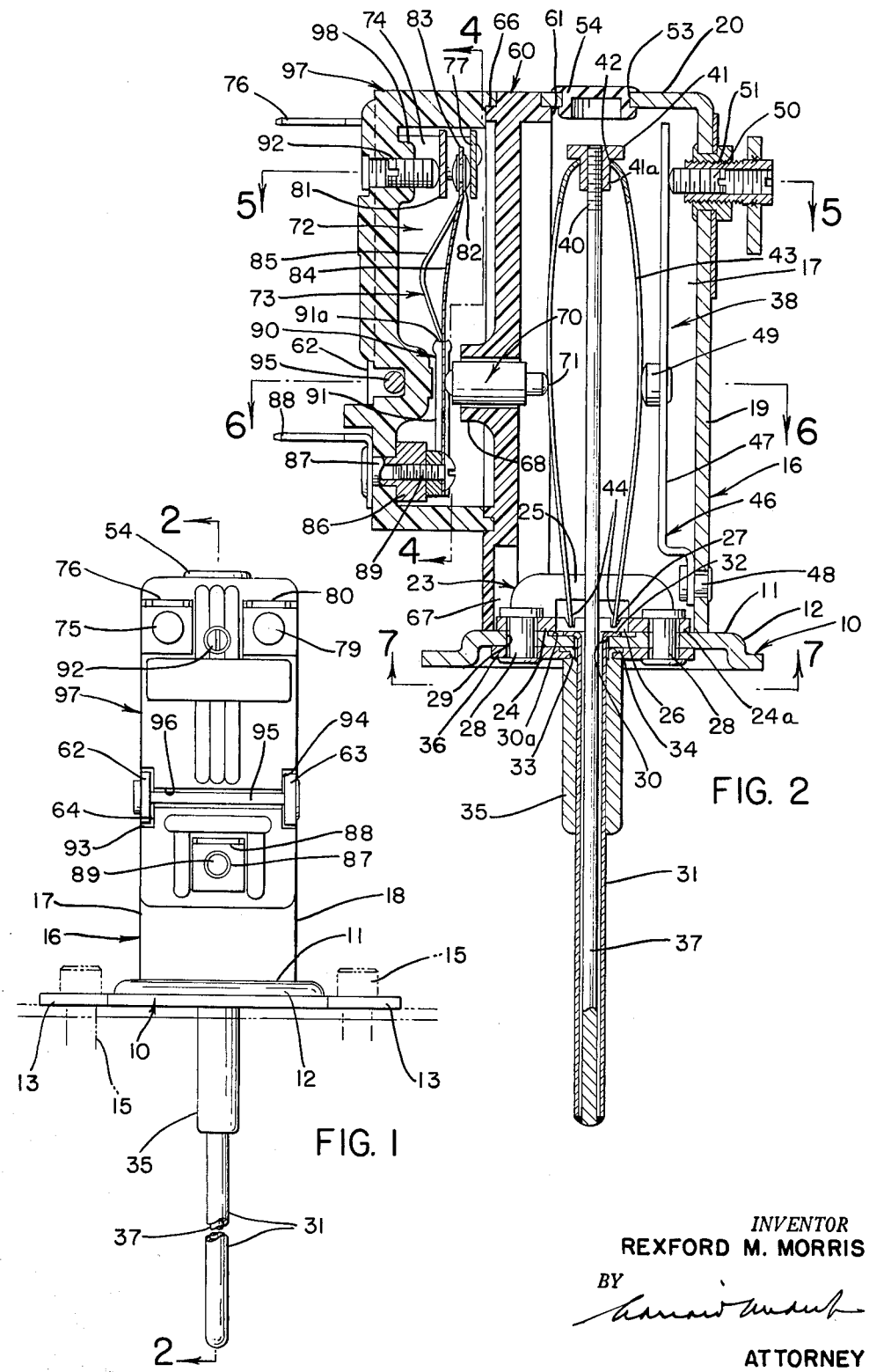

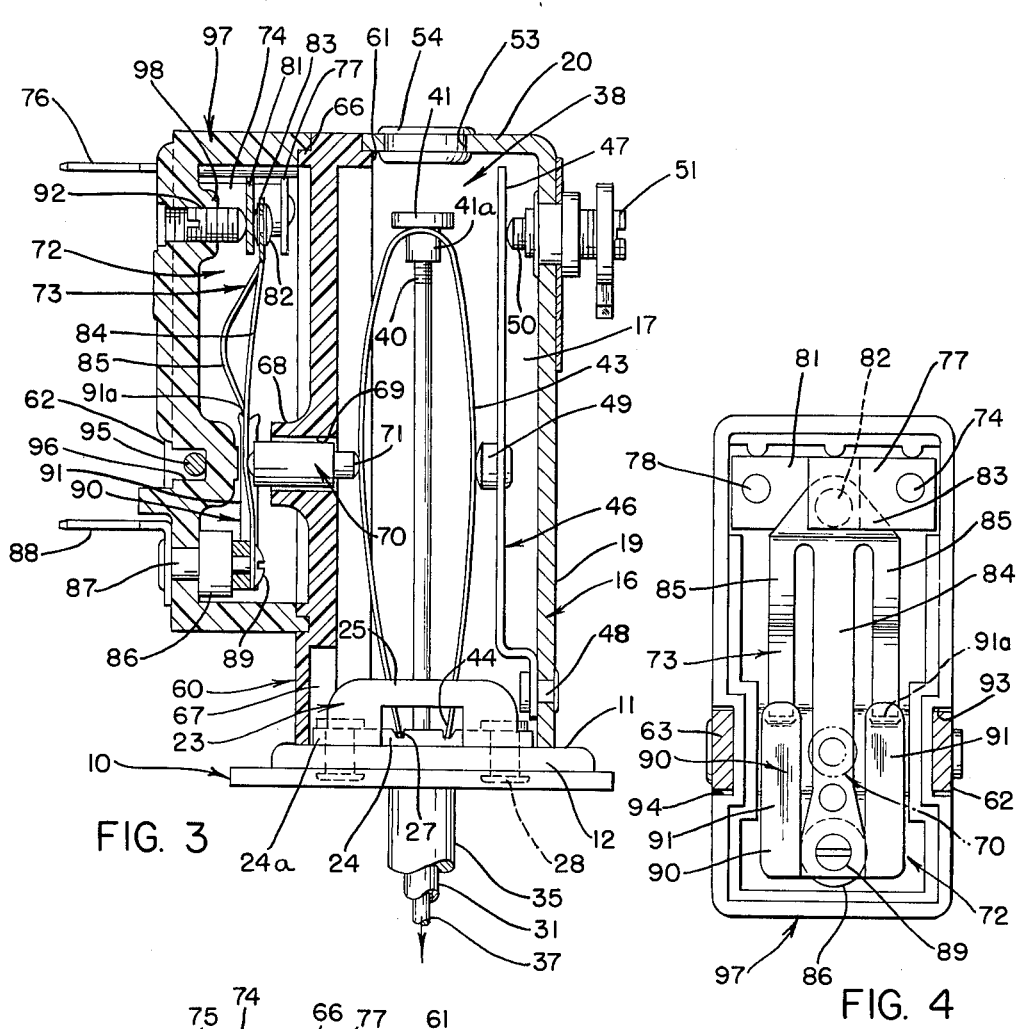
FIG. 3
FIG. 4
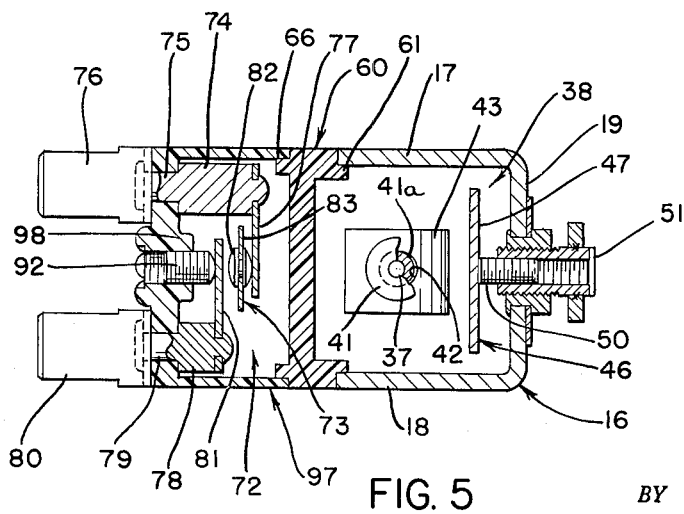
FIG. 5
INVENTOR
REXFORD M. MORRIS
BY
ATTORNEY

INVENTOR
REXFORD M. MORRIS
BY
ATTORNEY

United States Patent Office 3,202,789
Patented Aug. 24, 1965

3,202,789
PROBE TYPE THERMOSTATIC CONTROL HAVING AMPLIFIED SWITCH ACTUATING MEANS
Rexford M. Morris, Mansfield, Ohio, assignor to Therm-O-Disc, Incorporated, Mansfield, Ohio, a corporation of Ohio
Filed Dec. 9, 1960, Ser. No. 74,893
9 Claims. (Cl. 200—137)

This invention relates to thermostatic controls and more particularly to a control embodying a thermo-responsive device wherein small relative movement between the elements of such device, is amplified and translated to actuate switch means for controlling an electric circuit or to operate a valve member for controlling the flow of fluid or gas.

It is among the objects of the present invention to provide a probe-type thermostatic control wherein the relative movement between the tube portion of the probe and the rod contained therein, is amplified by an actuator member to be effective to actuate switch elements controlling an electric circuit.

Another object of the invention is to provide a thermostatic control which embodies a continuous U-shaped actuator member, the apex of which is attached to a thermo-responsive member and wherein movement of the thermo-responsive member is amplified through the actuator member to effect the operation of an electric switch.

A further object of the present invention is to provide a probe-type thermostatic control wherein the movable rod of the probe is secured to the apex of U-shaped actuator member and including adjusting means for effecting a predetermined positioning or bowing of the sides of the actuator member with respect to switch actuating means.

A still further object of the invention is to provide in a probe-type thermostat, means wherein the relative longitudinal movement between the tube portion of the probe and the rod contained therein is translated laterally or transversely with respect to such movement at varying rates to effect the actuation of an electrical switch or valve member.

Figure 7:
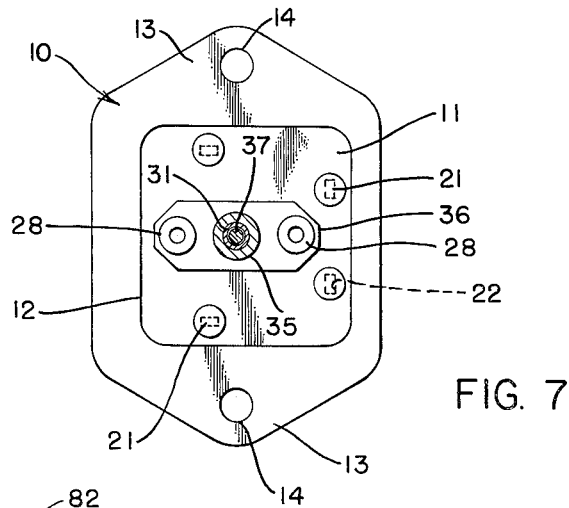
Figure 8:
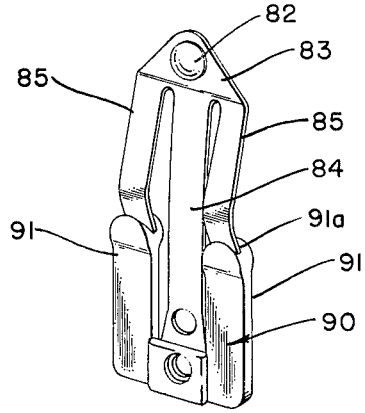

These and other objects and advantageous features of the invention, not at this time more particularly pointed out, will become apparent as the nature of the invention is better understood from the following detailed description taken in conjunction with the accompanying drawings, wherein like reference characters denote corresponding parts, and wherein:

FIGURE 1 is a front elevational view of the thermostatic control of the present invention, FIGURE 2 is a vertical sectional view taken centrally through the control along line 2—2 of FIGURE 1 and showing the elements thereof under normal temperature conditions, FIGURE 3 is a fragmentary vertical sectional view of the control, similar to that shown in FIGURE 2 with the elements thereof in siwtch actuating position when the probe is under the influence of an elevated temperature, FIGURE 4 is a sectional view taken through the electrical switch mechanism along line 4—4 of FIGURE 2, FIGURE 5 is a transverse sectional view taken along line 5—5 of FIGURE 2, FIGURE 6 is a transverse sectional view taken centrally through the switch along the line 6—6 of FIGURE 2, FIGURE 7 is a bottom view partly in section taken along the line 7—7 of FIGURE 2, and FIGURE 8 is a perspective view of the snap member carrying the movable contact element of the switch.

With reference to the accompanying drawings, there is disclosed a thermostatic control constructed in accordance with the teachings of the present invention preferably for use in controlling an electrical circuit, however, I do not wish to be limited thereby as the actuating elements of the present invention are equally well suited for the operation of a valve member for controlling the flow of a fluid. The embodiment disclosed includes a substantially rectangular base 10 formed with a centrally disposed rectangular raised portion 11 connected with the base 10 by a wall portion 12. The ends of the base 10 (FIGURE 7) are angulated outwardly to form ears 13 which are suitably drilled as at 14 to receive bolts 15 (FIGURE 1) for securing the base plate to the housing of an appliance or other device with which the control may be used. Mounted in upstanding relation on the base plate 10 is a substantially rectangular housing or case 16 including opposed side walls 17 and 18, a back wall 19 (FIGURE 5) and a top wall 20. The lower edge surface of the walls 17, 18 and 19 are provided with depending tangs 21 which project through openings 22 in the base plate portion 11 and are peened over to rigidly secure the housing 16 to the base plate 10. Mounted on the upper surface of the raised portion 11 of the base plate 10 within the housing 16 is an elongated U-shaped actuated support member 23, including a base 24 and spaced upstanding side walls 25. The base 24 is formed with a longitudinally extending centrally disposed slot 26 which intersects spaced transverse slots 27 adjacent the extremities thereof. Outwardly projecting ears 24a are formed on the base 24 and suitably bored to receive rivets 28, arranged to extend through openings 29 in the base portion 11 for securing the member 23 on the upper surface of the portion 11.

The base portion 11 is provided with a central opening 30, counterbored to form a recess 30a about the periphery thereof. Projecting through the opening 30 and supported from the base 10 is a thermo-responsive device in the form of a probe which includes a tubular housing 31 having its end portion formed with a collar 32 which seats within the annular recess 30a formed about the opening 30. On the lower surface of the base portion 11 is a rectangular shaped washer 36 which has spaced openings therethrough for receiving the rivets 28. The rivets 28 serve to secure the washer 36, the base portion 11, and the U-shaped actuator support 23 into a unitary structure. The washer 36 has a central opening 33 in alignment with opening 30 in the base portion 11 and is provided with an annular recess surrounding the opening 33 to receive the outwardly extending flange 34 formed on the upper end of a tubular reinforcing member 35 for the tube 31. The tubular member 35 serves to support the tube 31 at spaced points below the base 10 through which it passes for purposes of rigidity and stability. The tube 31 is preferably made of stainless steel or other suitable metal having a relatively high coefficient of expansion and has mounted therein a rod or movable member 37, one end of which is secured in any suitable manner to the free end of the tube 31 by means of welding and the like. The rod 37 is preferably made of Invar metal or other material having a relatively low coefficient of expansion as compared to the stainless steel tube 31.

The rod 37 projects upwardly through the tube 31 into the actuator chamber 38 defined by the casing 16. The upper free end of the rod 37 is threaded as at 40 to receive an adjusting nut 41, the shank portion 41a of which is arranged to project through an opening 42 formed in the apex of an actuator member 43. The actuator member 43 is substantially U-shaped in configuration and arranged to extend longitudinally of the chamber 38 with the closed end portion being remote from the tube 31. The free ends of the legs of the member 43 are provided with centrally disposed tangs 44 which engage within the slot 26 in the base of the U-shaped member 23. The adjacent edge portions of the ends of the legs of the actuator member 43 seat within the transverse grooves 27 of the member 23. The loose fit between the ends of the legs of the member 43 and the base of the grooves 27 permits the sides of the actuator member to pivot about such point facilitating bowing or transverse movement of the sides of the member within the chamber 38 resulting from longitudinal movement of the rod 37 in response to the influence of temperature changes to which the tube 31 is subjected. It will be seen that a relatively small movement of the rod 37 which exerts a downward pull on the apex of the actuator member 43 will be amplified into a substantial outward lateral movement between the sides of the member 43.

Mounted within the chamber 38 and secured to the lower portion of the rear wall 19 by rivet 48 is an angulated member 46, the arm 47 thereof projects substantially coextensive with the chamber. Intermediate the extremities thereof the arm 47 carries a button 49 arranged to engage one side member of the actuator 43. The outer free end of arm 47 is engaged by an adjusting screw 50 which is threaded through a bushing 51 mounted in the upper portion of the back wall 19 of the casing 16. Adjustment of the screw 50 serves to move the end of the arm 47 and positions the bumper 49 thereon laterally within the chamber 38 and in so doing is effective to confine or restrict the lateral movement of the adjacent leg of the actuator members 43. Such restrictive movement of one side leg of the member 43 causes acceleration of the movement of the opposite side leg upon continued pull of the rod 37 on the actuator member. The top wall 20 of the casing 16 is provided with an opening 53 to permit access to the adjusting nut 41 which serves to secure the end of the rod 37 to the actuator member 43. By adjusting the adjusting nut 41 on the end of the rod 37, an initial bend or bowing is made in the actuator member to obtain a predetermined temperature setting at which the thermostatic control will operate. A suitable closure member 54 is removably mounted in the opening 53 to seal the chamber 38.

A substantially rectangular closure member 60 is provided for the open side of the casing 16. The side walls of the closure member are of greater thickness than the walls of the casing and the edge portions thereof have an offset providing an inwardly extending peripheral flange 61 adapted to extend inwardly of the edges of the wall portions 17, 18 and 20 of the casing 16 to form an overlapping joint therebetween. The vertical edge surfaces of the walls 17 and 18 of the casing 16 are provided with outwardly extending elongated members 62 and 63 which engage within rectangular cutaway slots 64 and 65 formed in the exterior surface of the side walls of the closure member 60 to position the latter on the open side of the casing. The lower inner wall section of the closure member 60 is suitably recessed as at 67 to clear the adjacent end of the bracket member 23 mounted on the base portion 11. Projecting from the outer face of the closure member 60 is a hub 68 which is centrally bored as at 69 for the reception of a freely slideable bumper member 70. The inner end 71 of the bumper member is adapted to engage the adjacent side leg of actuator member 43 at a point opposite to the button 49.

Formed on the outer surface of the closure member 60 is a peripheral outwardly extending flange 66 adapted to seat within an inwardly extending offset in the edge portion of the open end of a rectangular switch housing 97 to provide an overlapping joint therebetween. The housing 97 defines a switch chamber 72 in which a switch 73 is mounted. With reference to FIGURE 5 of the drawings, the switch 73 includes a terminal post 74 positioned at one end of the chamber 72, the shank portion 75 of which extends through the housing wall and engages and is secured to a terminal 76. Mounted on the end face of the terminal post 74 is a contact plate 77 projecting transversely of the switch chamber 72. Spaced laterally of the terminal post 74 within the chamber 72, there is positioned a second terminal post 78 of lesser height, similarly having a shank portion 79 extending through the wall of the housing 97 and secured to a terminal 80. On the free end of the terminal post 78, there is mounted a contact plate 81 which projects laterally within the chamber 72 and underlies the contact plate 77. The plates 77 and 81 are spaced apart sufficiently to receive therebetween a movable contact button 82 adapted to engage the respective plates 77 and 81 in response to movement of a snap element upon which the contact button is mounted. The snap element comprises a body portion 83, having a central elongated leg member 84 projecting the length of the switch chamber, and leg members 85 projecting from the body on each side of the leg member 84. The outer free end of the leg member 84 engages the upper surface of a terminal post 86 (FIGURE 2) the shank portion 87 thereof extends through the wall of the housing 97 and is secured to a terminal 88. The terminal post 86 is suitably bored and tapped to receive a cap screw 89. Mounted on the post 86 is a U-shaped bracket 90, the legs 91 thereof projecting toward the center of the chamber 72. The ends of the legs 91 are transversely grooved as at 91a to receive the outer free ends of the leg members 85 of the snap element. The cap screw 89 serves to secure the end of the member 84 and the bracket 90 on the top of the terminal post 86. When the bracket and snap element are thus assembled in operative position, the legs 85 are bowed outwardly to the left as viewed in FIGURE 3 so as to exert pressure on the end of the snap element to cause the contact button carried thereby to be normally held in engagement with the lower surface of the contact plate 77. When pressure is exerted on the arm 84 by the end of the bumper member 70, to overcome the tension in the over center spring members 85, the contact button is moved from the contact plate 77 to contact plate 81 with a snap action and similarly reverses the action upon the release of pressure on the arm 84. The contact plate 81 is relatively flexible and an adjusting screw 92 is suitably threaded through a boss 93 in the wall of the casing 16 to engage the outer extremity of the plate 81 to effect an adjustment in the space between the contact plates 77 and 81 through which the snap element is caused to move the contact button 82.

The exterior surface of the opposite sides of the switch housing 71 are provided with slots 93 and 94 which align with the slots 64 and 65 of the closure member 60 and receive the ends of the extensions 62 and 63 formed on the sides of the housing 16. The ends of the members 62 and 63 have aligned openings therethrough to receive a bolt 95 which seats within a transverse slot 96 in the face of the switch housing and holds the closure 60 and switch housing of the thermostat in assembled relation.

When the thermostatic control unit is organized with an appliance such as a clothes drier or heating furnace, the heat-sensitive element of the device is immersed in the air stream or otherwise exposed and subjected to the temperature of the heating medium at or adjacent the heater. When so mounted, the various elements of the control are positioned as shown in FIGURE 2, assuming that the ambient temperature is below the critical one at which the actuator will open the switch 73. As the temperature rises, the tube 31 expands and the rod 37 moves downwardly as viewed in FIGURE 3. The downward pull of the rod 37 on the apex of the actuator member 43 moves the sides thereof laterally until the one side enegages the button 49. Up to this point, the lateral movement of both legs of the actuator member is substantially the same, upon engagement with the bumper 49 further bowing movement concentrates the lateral movement on the left side of the actuator as viewed in FIG- URE 3 against the end 71 of the slidable bumper 70. Upon continued downward movement of the rod 37, the actuator forces the bumper against the contact-carrying arm 84 with sufficient pressure to overcome the tension of the spring elements holding the contact 82 in engagement with the contact plate 77 and moves the contact 82 with a snap action across the intervening space into engagement with the contact plate 81. When the temperature-sensitive element cools, the pulling pressure on the actuator is released and the lateral force on the bumper member is relieved and the spring elements 85 will move the contact-carrying arm with a snap action to its original position as shown in FIGURE 2, reengaging the contact button with the contact plate 77.

It will be seen that an exceedingly small relative movement between the rod and tube of the temperature-sensitive probe may be greatly amplified by the actuator member and translated to actuate the elements of the electric switch. Thus, a highly desirable and advantageous feature in a thermostatic control is obtained by the foregoing construction in that the control is effective to operate within narrow temperature differential ranges heretofore unattainable in devices of this type.

Although the invention has been described and illustrated in connection with a specific electric thermostatic switch, it will be understood that the actuator element may be used for operating other types of switches or may be used to actuate a valve member.

While I have described a preferred embodiment of my invention, it is to be understood that various changes and modifications may be made therein without departing from the scope or spirit of the invention as defined in the appended claims.

I claim:

1. In a heat sensitive control device, a housing, an electric switch in said housing having a stationary contact and a mobile contact movable into and out of engagement with said stationary contact, a snap-acting movable arm carrying said mobile contact, a probe projecting from said housing and having an elongated tubular member which is movable in response to changes in temperature, a rod secured to said tubular member and projecting into said housing, a bifurcated actuator member in said housing having two legs which are bowed outwardly in opposite directions, the ends of said legs being anchored on said housing, said rod and actuator member being arranged coaxially, means connecting said rod to the central portion of said actuator member between said legs to cause bending of said legs in response to axial movement of said rod to amplify such movement, stop means for holding the central portion of one of said legs against lateral outward movement, and means operably connected between said arm and the central portion of the other of said legs for imparting such amplified movement to the contact-carrying arm to actuate said arm.

2. In a heat sensitive control device, a switch having a stationary contact, a mobile contact for engagement with the stationary contact and a movable contact-carrying arm which carries the mobile contact, means for actuating said mobile contact-carrying arm comprising a housing, a probe projecting from the base of said housing having an elongated tubular member and a rod mounted therein, said rod secured to said tubular member at the outer free end thereof and the other end projecting into said housing through an opening in the base thereof, an elongated bifurcated actuator member having two outwardly bowed legs with the ends thereof anchored in the housing base at diametrically opposed sides of the opening through which the rod extends, the free end of said rod connected to the apex of said actuator member and adapted to reduce the overall length of the actuator member and translate laterally the longitudinal movement of said elongated rod member to actuate the contact-carrying arm of said switch, and means for reducing the lateral movement of one of said legs of the actuator member with respect to the other of said legs.

3. In a heat sensitive control device, an electric switch having a stationary contact and a mobile contact for engaging the stationary contact, a movable contact-carrying arm which carries said mobile contact, a housing, means for actuating said movable arm comprising a probe projecting from the base of said housing and having an elongated tubular member which is longitudinally movable in response to heat changes, a rod secured to said tubular member and projecting into said housing, an elongated bifurcated spring member having the ends thereof anchored in the base of the housing adjacent said rod, said rod and spring member being arranged coaxially, said spring member acting between said elongated tubular member and said contact-carrying arm and serving to amplify the longitudinal movement of said rod and to translate such amplified movement transversely to the contact-carrying arm of the switch for actuating said switch, said spring member having two legs which bow outwardly in response to axial movement of said rod to move said arm, means for limiting the outward movement of one of said legs and for operably connecting the other of said legs to said contact-carrying arm.

4. In a thermostatic control, a housing defining a chamber, a switch mounted in said housing, an elongated tubular probe housing secured to one side of said chamber housing, a bifurcated actuator member mounted in said chamber, said actuator member having two legs bowed outwardly in opposite directions, a rod member having one end secured to the apex of said actuator member and extending intermediate the said legs, the other end of said rod anchored within the probe housing at the outer free end thereof, said probe housing when subjected to temperature changes effective to cause the rod to change the overall length of the actuator member and thereby move the legs of the actuator member laterally within said chamber, means responsive to the lateral separation of said legs for actuating said switch, and means for varying the lateral movement of one of said legs with respect to said switch actuating means.

5. In a thermostatic control, a housing defining a chamber an elongated tubular probe housing projecting outwardly from one side of said chamber housing, a bifurcated actuator member disposed in said chamber with the ends of the legs anchored in the base of the housing adjacent the said probe housing, a rod member having one end secured in the outer end of said probe housing and the other end projecting into said chamber and operatively connected to said bifurcated actuator member whereby when said probe housing is subjected to decreases in temperature the said movable member reduces the overall length of said actuator member and thereby causes the legs of said actuator member to bow outwardly within said chamber, a switch in said housing, means responsive to relative movement between said legs for actuating said switch, and means for varying the lateral movement of one of said legs with respect to said switch actuating means.

6. A thermostatic control comprising a housing containing a switch assembly including a fixed contact and a mobile contact, a cantilever spring arm in the form of a snap-acting blade having integrally formed bowed spring means adapted to urge said mobile contact into engagement with said fixed contact, said mobile contact being located on the free end of said cantilever arm, a probe projecting from said housing and having an elongated tubular member which is longitudinally movable in response to temperature changes, a narrow rod within said tubular member and projecting into said housing, a bifurcated actuator member elongated in the direction of said rod and having two leg portions on opposite sides of said rod which are bowed outwardly away from said rod, said rod having one end secured to said tubular member and its opposite end secured to said actuator member intermediate the leg portions thereof and serving to reduce the overall length of said actuator member in response to an increase in temperature thereby causing said leg portions to bow outwardly away from said rod, said rod and actuator member being arranged coaxially, means for limiting movement of the intermediate part of one of said leg portions, and means operably connected between said cantilever arm and the intermediate part of the other of said leg portions to transmit the lateral displacement of said last-named part to said arm to actuate said switch.

7. A thermostatic control comprising a housing containing a switch assembly including a fixed contact, a cantilever mounted contact-carrying arm in the form of a blade having integrally formed bowed spring members, adapted to urge the contact carried thereby into engagement with said fixed contact, a second housing adjacent said switch housing defining a chamber, an elongated probe housing secured to one side of said second housing, a U-shaped actuator member having two outwardly bowed legs with the ends thereof anchored in said chamber, a rod movable within the probe housing having one end secured to the said actuator member and the other end anchored in the extremity of said probe housing and arranged to reduce the overall length of said actuator member to laterally displace the intermediate portions of said legs upon temperature changes, said rod and actuator member being arranged coaxially, means for limiting the lateral displacement of the intermediate portion of one of said legs, and means responsive to the lateral displacement of the intermediate portion of the other of said legs for transmitting said lateral displacement to said contact-carrying arm to move the same.

8. A thermostatic control comprising a housing arranged to contain a switch assembly including a fixed contact, a cantilever mounted contact-carrying arm in the form of a blade having integrally formed therewith bowed spring elements adapted to urge the contact carried by the said arm into engagement with said fixed contact, a second housing contiguous to said switch housing defining an actuator chamber, an elongated probe housing projecting from the bottom of said second housing, a bifurcated actuator member mounted in said chamber and having two outwardly bowed legs, a rod member having one end secured in the extremity of said probe housing and arranged to project into said actuator chamber between the sides of the bifurcated actuator and have the end thereof secured to the top of the actuator, said rod member adapted to laterally displace the sides of the bifurcated member by reducing its overall length upon decreases in temperature, means responsive to separation of said sides for transmitting said lateral displacement to said contact-carrying arm to move the same, and means for varying the lateral movement of one of said legs with respect to said lateral displacement transmitting means.

9. A thermostatic control comprising a housing defining a chamber arranged to contain a switch assembly including spaced fixed contacts, a cantilever mounted contact-carrying arm in the form of a blade having integrally formed therewith bowed spring elements adapted to urge the contact carried thereby into engagement with one of said fixed contacts, a second housing defining an actuator chamber, a wall member separating said switch chamber from said actuator chamber, a switch-engaging member slidably mounted in said wall member, an elongated probe housing secured to the base of said second housing, a bifurcated actuator member having two outwardly bowed legs mounted in said actuator chamber and an elongated rod member having one end secured to the said actuator member and the other end anchored in the extremity of said probe housing, said rod member arranged to reduce the overall length of said actuator member and to laterally displace one side of the actuator member into engagement with said switch-engaging member in response to decreases in temperature to cause the contact-carrying arm to move the movable contact from one fixed contact to the other, and means for varying the lateral movement of one of said legs with respect to said switch-engaging member.

References Cited by the Examiner

UNITED STATES PATENTS

| 928,937 | 7/09 | Bulkley | 200—137 |
| 2,044,822 | 6/36 | Vaughn | 200—137 |
| 2,618,722 | 11/52 | De Witt | 200—137 |
| 2,728,068 | 12/55 | Adams et al. | 200—137 |
| 2,778,901 | 1/57 | Cunningham | 200—137 |

FOREIGN PATENTS

| 453,066 | 9/36 | Great Britain. |
| 599,228 | 3/48 | Great Britain. |
| 648,202 | 1/51 | Great Britain. |

BERNARD A. GILHEANY, *Primary Examiner.*

MAX L. LEVY, *Examiner.*